(12) United States Patent
Ha et al.

(10) Patent No.: US 8,025,919 B2
(45) Date of Patent: Sep. 27, 2011

(54) CATALYST FILLING METHOD IN MICRO-CHANNELS AND REFORMING APPARATUS MANUFACTURED BY THE METHOD

(75) Inventors: Ji Won Ha, Gyungsangnam-Do (KR); Young Soo Oh, Gyunggi-Do (KR); Jae Hyuk Jang, Gyunggi-Do (KR); Hong Ryul Lee, Gyunggi-Do (KR); Jae Hyoung Gil, Seoul (KR); Sung Han Kim, Gyunggi-Do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 1087 days.

(21) Appl. No.: 11/783,652

(22) Filed: Apr. 11, 2007

(65) Prior Publication Data

US 2007/0254095 A1   Nov. 1, 2007

(30) Foreign Application Priority Data

Apr. 19, 2006 (KR) .................. 10-2006-0035423

(51) Int. Cl.
*B65B 1/06* (2006.01)
*B65B 1/00* (2006.01)
*B65B 1/04* (2006.01)
*B65B 1/44* (2006.01)
*H01M 4/00* (2006.01)

(52) U.S. Cl. ....... 427/115; 427/58; 427/105; 427/126.1; 427/126.3; 427/180; 427/181; 427/230; 427/331; 427/372.2; 429/400; 429/507; 429/508; 429/535; 141/69; 141/73; 141/74; 141/80; 422/211

(58) Field of Classification Search .................. 427/115, 427/105, 180, 181; 429/400, 507, 508, 535; 141/69, 73, 74, 80; 422/211
See application file for complete search history.

(56) References Cited

U.S. PATENT DOCUMENTS

| 5,180,561 A | 1/1993 | Morishima et al. |
| 6,357,103 B1* | 3/2002 | Sikorski .......................... 29/458 |
| 2006/0057450 A1* | 3/2006 | Morse et al. .................... 429/35 |
| 2007/0084519 A1* | 4/2007 | Brennom .......................... 141/2 |

FOREIGN PATENT DOCUMENTS

CN    1589174 A    3/2005

(Continued)

OTHER PUBLICATIONS

Kundu et al., "MEMS-based Micro-Fuel Processor for Application in a Cell Phone", Journal of Power Sources, vol. 162, pp. 572-578, (2006).*

(Continued)

*Primary Examiner* — Michael Cleveland
*Assistant Examiner* — Lisha Jiang
(74) *Attorney, Agent, or Firm* — McDermott Will & Emery LLP

(57) ABSTRACT

A catalyst filling method in a micro channel and a reformer manufactured by the method. The catalyst is filled in the micro channel using water, and unidirectional pressure is applied to the catalyst in the micro channel to fill the micro channel with high density. The catalyst in the micro channel is dried. The method according to the present invention allows uniformly filling the catalyst particles in the micro channel of the reformer with high density, increasing the reactive surface area of the catalyst particles with the fuel, thereby allowing highly efficient reforming effect.

4 Claims, 5 Drawing Sheets

FOREIGN PATENT DOCUMENTS

| | | |
|---|---|---|
| JP | 06-111838 | 4/1994 |
| JP | 2003-48701 | 2/2003 |
| JP | 2003-284943 | 10/2003 |
| KR | 1996-0006929 | 5/1996 |
| WO | WO 2004/030805 A1 | 4/2004 |

OTHER PUBLICATIONS

Pattekar et al., "A Radial Microfluidic Fuel Processor", Journal of Power Sources, vol. 147, pp. 116-127, (2005).*

Kothare et al., "A Microreactor for Hydrogen Production in Micro Fuel Cell Applications", Journal of Microelectromechanical Systems, vol. 13 No. 1, pp. 7-18, (Feb. 2004).*

Kwon et al., "Silicon-based Miniaturized-Reformer for Portable Fuel Cell Applications", Journal of Power Sources, vol. 156, pp. 253-259, (Aug. 2005).*

Chinese Office Action, with English Translation, issued in Chinese Patent Application No. CN 200710096459.6, dated Sep. 12, 2008.

Japanese Office Action issued in Japanese Patent Application No. 2007-110185, mailed Oct. 26, 2010.

* cited by examiner

CATALYST FILLING METHOD IN MICRO-CHANNELS AND REFORMING APPARATUS MANUFACTURED BY THE METHOD

CLAIM OF PRIORITY

This application claims the benefit of Korean Patent Application No. 2006-0035423 filed on Apr. 19, 2006, in the Korean Intellectual Property Office, the disclosure of which is incorporated herein by reference.

BACKGROUND OF THE INVENTION

1. Field of the Invention

The present invention relates to a catalyst filling method in a micro channel and a reforming apparatus manufactured by the method. More particularly, the invention relates to a catalyst filling method in a micro channel, which fills the catalyst for reforming fuel in a microchannel more effectively, uniformly and densely using water and gravity, thereby obtaining a highly efficient reforming effect and achieving miniaturization of a fuel cell, and to a reforming apparatus manufactured by the method.

2. Description of the Related Art

Recently, there have been increased uses of portable small-sized electronic devices including mobile phones, Personal Digital Assistants (PDAs), digital cameras, notebook computers and the like. In particular, since the launch of Digital Multimedia Broadcasting (DMB) through the mobile phones, the portable small-sized terminals are required to have increased power capacity. Lithium ion secondary batteries used in general to date, which have capacity for two-hour viewing of DMB, are undergoing efforts to improve their capacity, but there have been growing expectations on small-sized fuel cells for a more fundamental solution.

In order to realize such a small-sized fuel cell, either direct methanol type in which methanol is directly supplied to a fuel electrode or reformed hydrogen fuel cell (RHFC) type in which hydrogen is extracted from methanol and supplied to a fuel electrode can be adopted. The RHFC type uses hydrogen as fuel as in Polymer Electrode Membrane (PEM) type, thus having advantages in terms of output, power capacity per volume and in that it requires no reactants besides water. However, the method requires a reformer, thus having a disadvantage for miniaturization.

In order for the fuel cell system to achieve high power output density, a reformer is required to convert liquid fuel into gaseous fuel such as hydrogen gas. The reformer includes an evaporating part for gasifying methanol and a reforming part for converting methanol into hydrogen via catalytic reaction at a temperature ranging from 250° C. to 290° C.

In the reforming part, heat absorption reaction takes place and the temperature should be maintained from 250° C. to 290° C.

As a conventional example, Japanese Patent Application Publication No. 2003-048701 discloses are forming apparatus 350 as shown in FIG. 1. As shown in FIG. 1, such a conventional micro reforming apparatus 350 has an inner cavity 354 in an evaporating chamber 352 and a heater 356 disposed in the cavity 354 for evaporating fuel. The cavity 354 has a fuel spray 358 installed therein to spray a mixed liquid 360 of methyl alcohol and water, which is the fuel. The sprayed mixed liquid fuel 360 is heated and evaporated by the heater 356.

The gas produced by gasifying the mixed liquid 360 flows through a micro channel 362 and is reformed into hydrogen and carbon dioxide by a reforming catalyst 364 formed in the micro channel 362. In such a reformer 350, reforming catalyst 364 is coated inside the micro-channel 362.

FIG. 2 illustrates the process of coating the reforming catalysts inside the micro channel of the above-described reforming apparatus.

The most representative way of implementing such a process is dip coating, which entails as shown in FIG. 2(a) forming Ta—Si—O—N to form a thin film heater 402 and sputtering Au to form an electrode layer 404, sequentially on a silicon wafer 400.

In addition, as shown in FIG. 2(b), patterns are formed on the thin film heater 402 and the electrode layer 404, respectively, by photolithography. Then, an insulation film 406 is formed as shown in FIG. 2(c), and a photoresist is formed on an opposite side of the silicon wafer 400 by photolithography.

In addition, as shown in FIG. 2(d), channels 410 are formed by sand blasting in an undersurface of the silicon wafer 400, and the silicon wafer 400 is diced into several pieces as shown in FIG. 2(e).

Then, as shown in FIG. 2(f), a $Cu/ZnO/Al_2O_3$ catalyst layer 412 is coated in the channel 410. In this step, in order for a selective catalyst coating in the channel 410, a dry film photoresist 414 is applied on portions of the wafer excluding the portions of the channel 410. Then, using dip coating, an $Al_2O_3$ Boehmite layer 411 is formed in the channel. This is to increase the adhesive strength between the catalyst and the wall of the channel.

Then, the $Al_2O_3$ Boehmite layer 411 is dried at 100° C. and then the $Cu/ZnO/Al_2O_3$ catalyst layer 412 is formed as shown in FIG. 2(g) by dip coating. After the coating is completed, the resultant structure is anodic-bonded with a pyrex glass substrate 420 to complete a reformer 440 as shown in FIG. 2(h).

However, the conventional reforming apparatuses 350 and 440 have inefficiency in the process of reforming the fuel gas. That is, the fuel gas is reformed as it passes through the channels 362 and 410 of the reforming apparatus, but in the conventional reforming apparatuses 350 and 440, the fuel gas reacts with limited areas of the catalyst layers 364 and 412, thus lowering the conversion rate of the fuel gas into hydrogen.

SUMMARY OF THE INVENTION

The present invention has been made to solve the foregoing problems of the prior art and therefore an aspect of the present invention is to provide a catalyst filling method in a micro channel of a reforming apparatus, which allows uniformly and densely filling catalyst particles in a micro channel of a reforming apparatus to increase a reactive surface area of the catalyst particles with fuel, thereby obtaining a highly efficient reforming effect, and a reforming apparatus manufactured by the method.

Another aspect of the invention is to provide a catalyst filling method in a micro channel of a reforming apparatus, which allows filling the catalyst with high density to obtain improved reforming effects, thereby achieving miniaturization and increasing power output density, and a reforming apparatus manufactured by the method.

According to an aspect of the invention, the invention provides a catalyst filling method in a reforming apparatus for a fuel cell. The method includes:

filling a catalyst into a micro channel using water;

applying pressure to the catalyst filled in the micro channel in one direction to fill the catalyst in the micro channel with high density; and drying the catalyst in the micro channel.

According to the present invention, preferably, the step of filling the catalyst in a micro channel using water includes filling water in the micro channel of the reformer and injecting a mixture of the catalyst and water into the micro channel.

In addition, according to the present invention, preferably, the step of filling the catalyst in the micro channel with high density includes: injecting the mixture of the catalyst and water into the micro channel of the reforming apparatus and tilting the reforming apparatus with the mixture of the catalyst and water injected therein to fill the micro channel with the catalyst by gravity.

In addition, according to the present invention, preferably, the step of filling the catalyst in the micro channel with high density includes: injecting the mixture of the catalyst and water into the micro channel of the reforming apparatus, and tilting the reforming apparatus with the mixture of the catalyst and water injected therein to fill the micro channel with the catalyst by gravity, wherein the procedures of injecting and tilting are repeated until the micro channel is completely filled with the catalyst.

According to the present invention, preferably, the method further includes sealing a catalyst inlet with the same material as a substrate or a cover after drying the catalyst in the micro channel.

According to another aspect of the invention, the invention provides a reforming apparatus for a fuel cell including at least one catalyst inlet.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

A catalyst filling method in a micro channel according to the present invention allows filling catalyst particles 46 into a micro channel 42 uniformly with high density.

Figure 1:
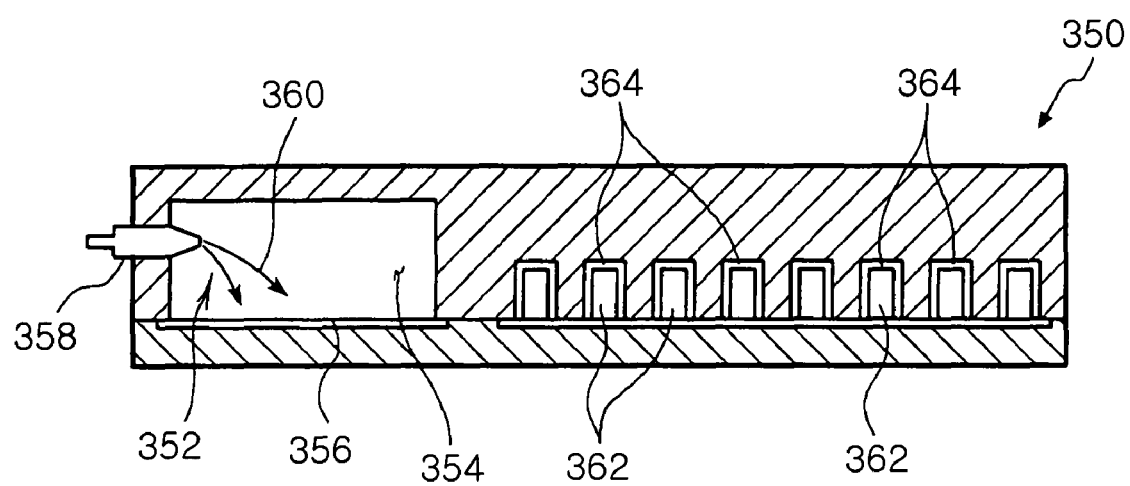
FIG. 1 is a sectional view illustrating a thin reforming apparatus according to the prior art.
Figure 2:
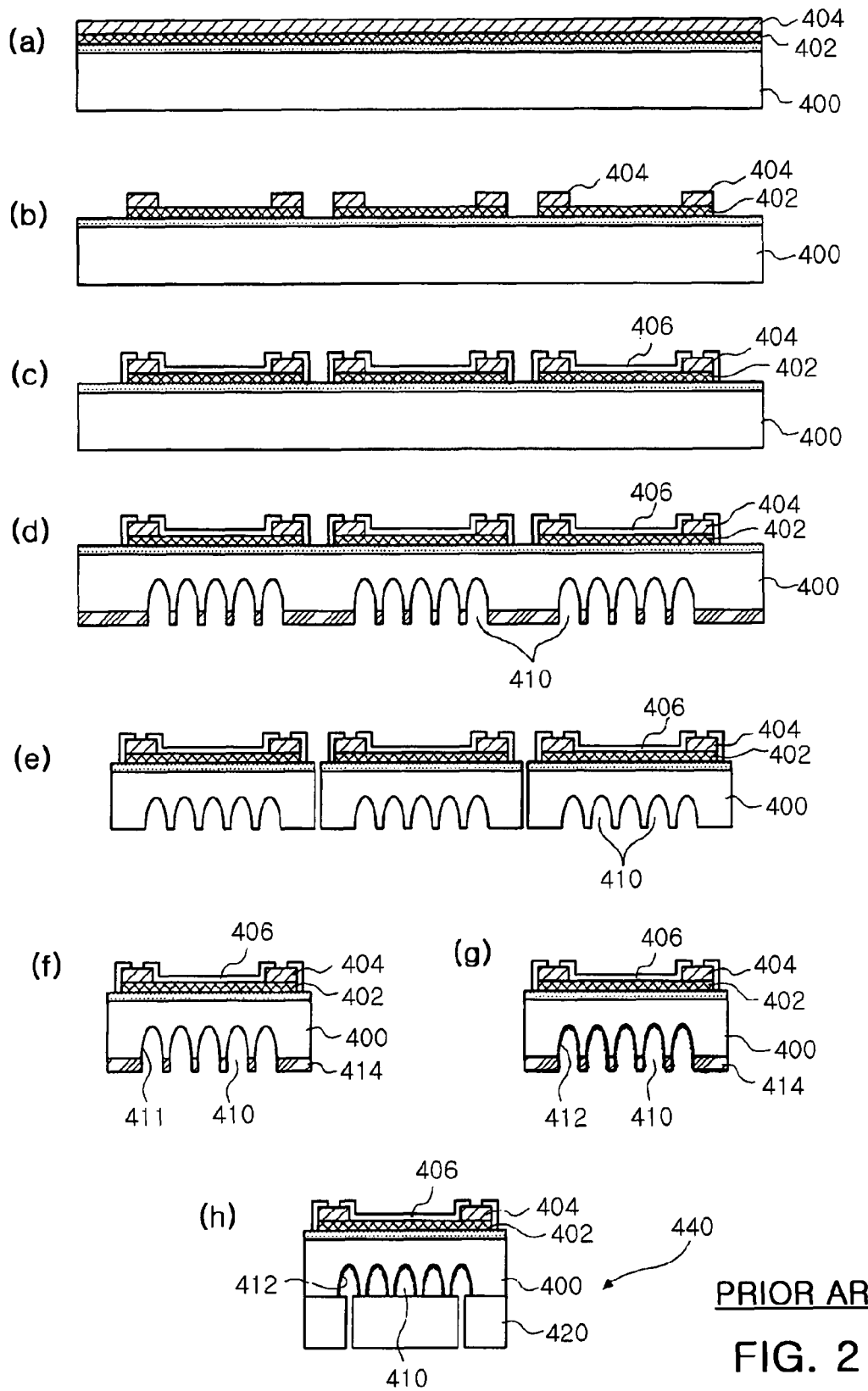
FIG. 2(a) to (h) are views illustrating a process of coating a catalyst layer on the thin reforming apparatus according to the prior art.
Figure 3:
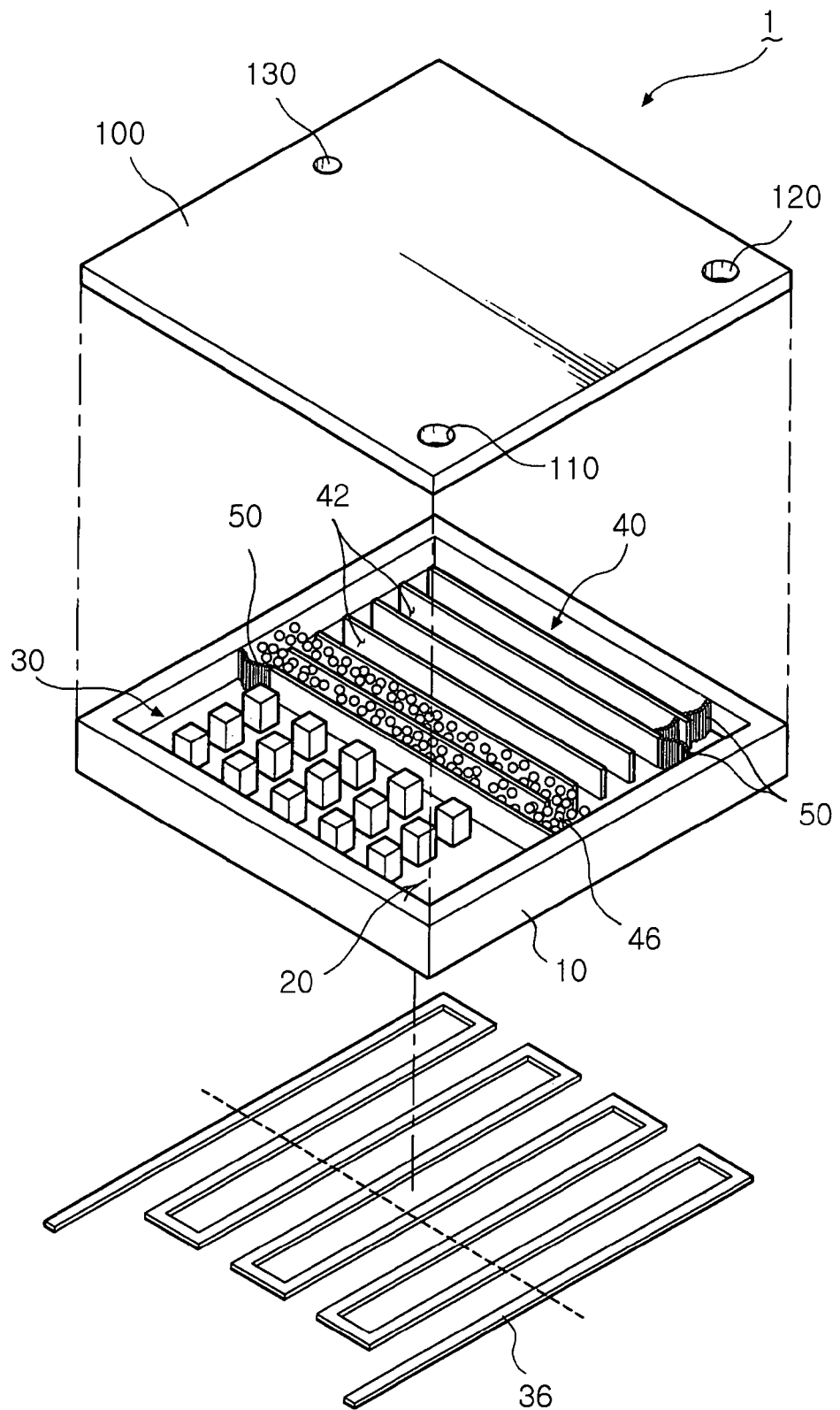
FIG. 3 is an exploded perspective view illustrating a reforming apparatus manufactured by a catalyst filling method in a micro channel according to the present invention.

FIG. 3 illustrates an example of a reforming apparatus 1 manufactured by the catalyst filling method in the micro channel according to the present invention.

Such a reforming apparatus 1 is only an example to which the present invention is applied, and does not limit the present invention.

The reforming apparatus 1 to which the present invention is applied includes a substrate 10 having a micro channel 42 formed therein. The substrate 10 can use silicon, metal, glass, ceramics and heat-resistant plastic, and has grooved micro channels 42 and partitions formed in various shapes in one side thereof by Micro Electro Mechanical Systems (MEMS).

Therefore, a fuel inlet part 20, an evaporator 30 and a reformer 40 are disposed in the grooved channel 42 formed in one side of the substrate 10.

The fuel inlet part 20 is formed at one side of the substrate 10 for injecting fuel into the micro channel 42 so that liquid fuel is supplied therethrough. And an evaporator 30 continues on from the fuel inlet part 20 to heat and gasify the liquid fuel. The evaporator 30, which is for gasifying the liquid-state fuel to obtain good reforming reaction, continues on from the fuel inlet part 20.

The evaporator 30 has a heater 36 as a heat source. The heater 36 is composed of an electric resistance circuit formed in a pattern on a lower surface of the substrate 10 to heat the evaporator 30 above, via the substrate 10.

In addition, according to the present invention, a reformer 40, which is formed downstream of the evaporator 30, is composed of a portion of the channel 42, through which fuel passes in the substrate 10 and is reformed into hydrogen gas via heat absorption reaction. The reformer 40 has a structure in which catalyst particles 46 that reform the fuel gas into hydrogen gas are filled inside the micro channel 42.

In the reformer 40, the fuel is converted to reformed gas, which is hydrogen-rich, via catalytic reaction. The catalyst particles 46 of the reformer 40 can be made of Cu/ZnO or $Cu/ZnO/Al_2O_3$, and the catalyst 46 is kept in the space inside the reformer 40 by catalyst filters 50. Preferably, the catalyst filters 50 can be formed at an entrance side and the exit side.

In addition, the reformer according to the present invention includes a cover 100 for covering the channel 42 of the substrate 10. The cover 100, which is made of the same material as the substrate 10 or pyrex glass, is anodic-bonded to the substrate 10 to form the evaporator 30 and the reformer 40 inside the substrate 10.

As shown in FIG. 3, the reforming apparatus for a fuel cell according to the present invention includes at least one catalyst inlet 130.

And the catalyst inlet 130 is formed in the portion of the cover 100 corresponding to the position of the reformer 40.

The reforming apparatus for a fuel cell according to the present invention includes the fuel inlet 110 formed in the cover 100 for supplying liquid fuel to the fuel inlet part 20, a hydrogen outlet 120 for externally discharging the hydrogen generated as the liquid fuel is reformed, and the catalyst inlet 130 for filling the reforming catalyst particles 46 into the reformer 40.

The method of filling the catalysts into the micro channel of the above-described reforming apparatus 1 according to the present invention starts with a step of filling the catalyst 46 into the micro channel 42 using water.

Figure 4:
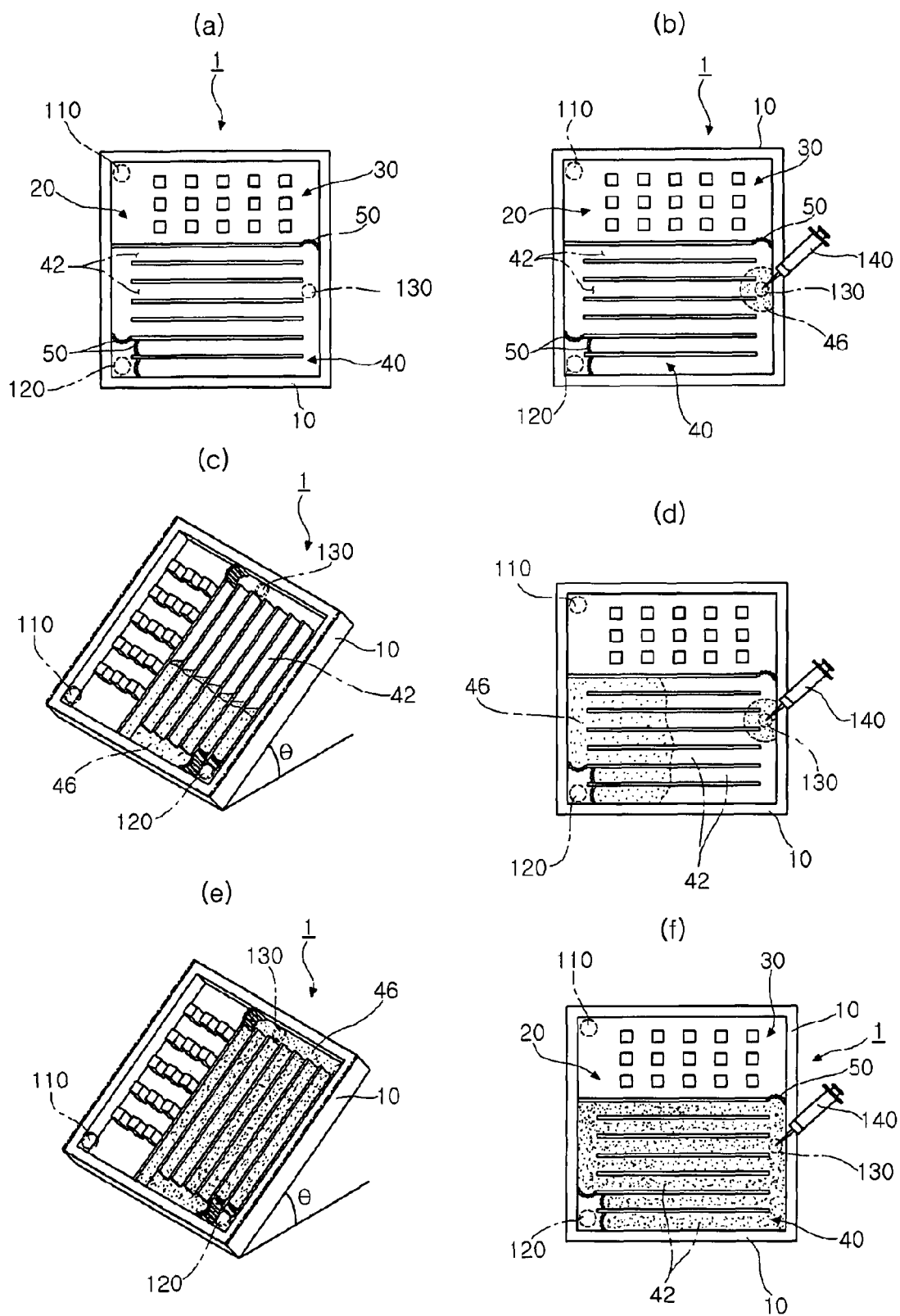
FIG. 4(a) to (f) are views illustrating a process of filling the catalyst in the micro channel according to the present invention.

As shown in FIG. 4(a), this step entails inserting the reforming apparatus 1 into a water tank (not shown) to fill the micro channel 42 with water. At this time, the water can be flown into the micro channel 42 through a water inlet, which may be one of the catalyst inlet 130, the fuel inlet 110 and the hydrogen outlet 120.

In the catalyst filling method according to the present invention, the catalyst particles 46 are filled into the reforming apparatus 1 through the catalyst inlet 130, and at this time, as shown in FIG. 4(b), a mixture of the catalyst 46 and water is injected into the micro channel 42 of the reforming apparatus 1 using a syringe 140, etc.

The reason for filling the micro channel 42 with water is to remove air in the micro channel 42, and if the air is present inside the micro channel 42, it is impossible to densely fill the catalyst 46 into the micro channel 42.

After filling with water as described above, the mixture of the catalyst 46 and water is injected into the micro channel 42 of the reforming apparatus 1 through the catalyst inlet 130. After a predetermined amount of the mixture is injected, pressure is applied in one direction to the catalyst 42 filled in the micro channel 42 to fill the micro channel with the catalyst 42 with high density.

In this case, in order to fill the catalyst 46 into the interior of the reforming apparatus 1 with high density, a predetermined amount of the mixture of the catalyst 46 and water is injected into the micro channel 42 of the reforming apparatus, and then the reforming apparatus 1 is tilted at a predetermined angle θ to fill the micro channel with the catalyst by gravity.

If the reformer 1 is tilted as described above inside the water tank, the specific gravity of the catalyst 46 is greater than that of the water, and thus the catalyst particles 46 precipitate inside the micro channel 42 of the tilted reforming apparatus, and thereby the reforming apparatus 1 begins to be filled from a portion thereof with high density, as shown in FIG. 4(c). In this case, due to the interaction with water, the catalysts 46 having rough outer surfaces do not have much friction with each other but precipitate one by one to fill the micro channel with high density, without forming any empty spaces such as air pockets where no catalyst is present. In this process, in order for the catalyst particles 46 to fill the micro channel more uniformly, external force can be applied to the reforming apparatus by for example tapping on the outer surface of the reforming apparatus or applying vibration to the reforming apparatus.

The impacts or the vibration provide an external force that allows the catalyst particles 46 to be filled in one direction inside the micro channel 42 of the reforming apparatus, thereby enabling the catalyst particles to fill the micro channel with higher density.

After filling the micro channel 42 of the reforming apparatus with the catalyst 46 for the first time, as shown in FIGS. 4(d), (e), and (f) the mixture of the catalyst 46 and water is additionally injected into the micro channel 42 of the reforming apparatus and the reforming apparatus 1 is tilted. Therefore, the above procedure is repeated multiple times to completely fill the micro channel 42 with the catalyst 46. After filling the micro channel with the catalyst 46 as described above, the catalyst 46 is dried in the micro channel 42.

In the step of drying the catalyst 46 in the micro channel 42, the reforming apparatus 1 is taken out of the water tank and dried while being placed tilted or is placed on a hot plate and heated to remove moisture.

In addition, the method according to the present invention further includes sealing the catalyst inlet 130 with the same material as the cover after drying the catalyst 46 in the micro channel 42.

In the above-described catalyst filling method, water is used to fill the catalyst 46 into the micro channel 42, thus minimizing friction between the catalyst particles 46 in the micro channel 42. This allows the catalyst particles 46 to precipitate one by one in the micro channel to fill the micro channel with high density, preventing formation of empty spaces such as air pockets without any catalyst 46 present, in the micro channel 42 of the reforming apparatus.

In addition, in this process, external force such as impacts or vibration can be applied to the reforming apparatus 1, which further forces the catalyst particles 46 in one direction in the micro channel so that the micro channel can be filled with higher density.

As described above, the mixture of the catalyst 46 and water is injected into the micro channel 42, and the catalyst particles 46 are allowed to fill the micro channel 42 by gravity, and this procedure is repeated so that the micro channel is filled naturally with high density without any empty spaces such as air pockets in the micro channel 42.

In addition, the method according to the present invention includes sealing the catalyst inlet 130 with the same material as the substrate or the cover after drying the catalyst 46 in the micro channel to complete the reforming apparatus.

Figure 5:
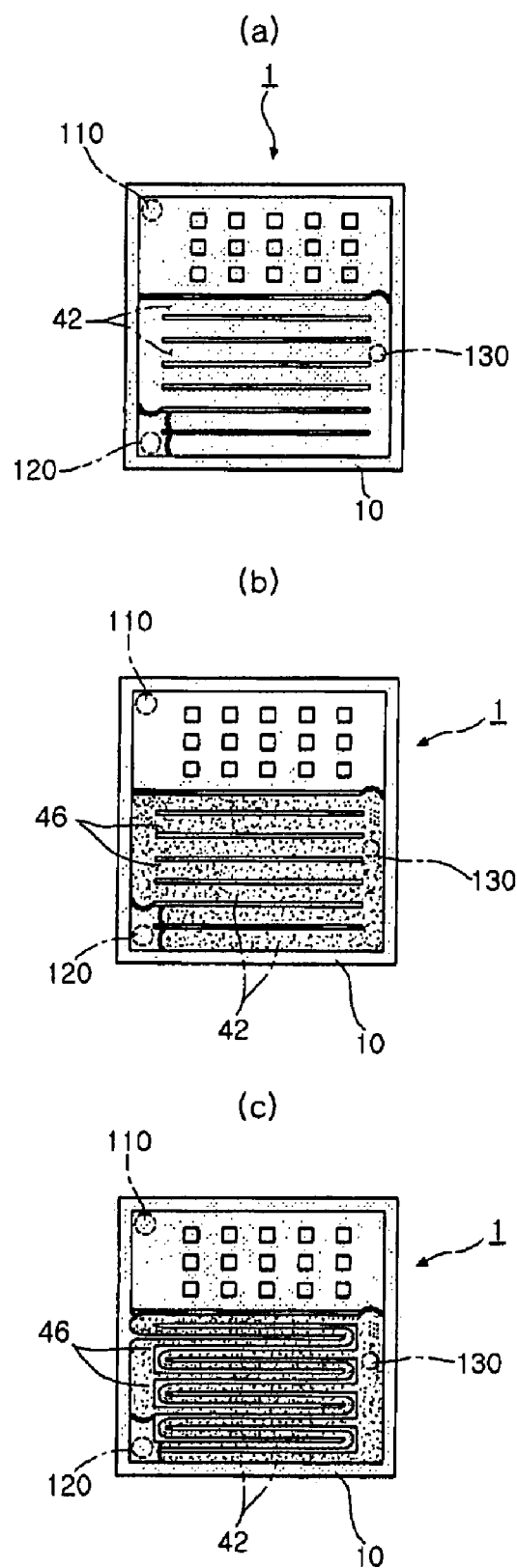
FIG. 5 is a view illustrating the reforming apparatus with catalyst filled in the micro channel according to the method of the present invention, in which (a) is a plan view illustrating the reformer before filling the catalyst, (b) is a plan view illustrating the catalyst filled in a parallel channel of a reforming apparatus, and (c) is a plan view illustrating the catalyst filled in a serpentine channel of a reforming apparatus.

FIG. 5 illustrates a reforming apparatus 1 manufactured according to the present invention.

FIG. 5(a) illustrates a reforming apparatus 1 without the catalyst 46 filled therein.

As shown in FIG. 5(b), in such a reforming apparatus 1, the catalyst 46 can be filled in a plurality of parallel micro channels 42 with open ends thereof. Alternatively, as shown in FIG. 5(c), the catalyst 46 can be filled in a serpentine micro channel 42.

In these structures, the catalyst inlet 130 formed corresponding to the position of the reformer 40 is sealed after the catalyst 46 is completely filled.

Therefore, the catalyst filling method according to the present invention allows a micro channel having a width as small as 500 μm to be filled with high density.

As described above, densely filling the micro channel with the catalyst allows increasing a reactive surface area of the catalyst 46 with the fuel. In addition, densely filling the micro channel with the catalyst allows a highly efficient reforming effect at relatively a low operation temperature such as 150☐ to 200☐ than the conventional reforming apparatus 1. This enables application of the reforming apparatus to small electronic devices such as mobile phones.

According to the present invention as set forth above, catalyst particles can be filled in a micro channel of a reforming apparatus with high density to increase a reactive surface area of the catalyst particles with fuel, thereby allowing a highly efficient reforming effect.

Furthermore, the present invention allows filing the catalyst in the micro channel of the reformer with high density without forming air pockets, achieving miniaturization of a fuel cell, thereby further increasing the power output density of a reforming apparatus.

While the present invention has been shown and described in connection with the exemplary embodiments, it will be apparent to those skilled in the art that modifications and variations can be made without departing from the spirit and scope of the invention as defined by the appended claims.

What is claimed is:

1. A catalyst filling method in a reforming apparatus for a fuel cell, comprising:
    filling a micro channel with water for removing air in the micro channel;
    injecting a mixture of a catalyst and water into the micro channel while draining the water filled in the micro channel;
    applying pressure to the catalyst filled in the micro channel in one direction to fill the catalyst in the micro channel without forming any voids in the micro channel; and
    drying the catalyst in the micro channel.

2. The method according to claim 1, wherein the step of filling the catalyst in the micro channel without forming any voids in the micro channel comprises:

injecting the mixture of the catalyst and water into the micro channel of the reforming apparatus, and tilting the reforming apparatus with the mixture of the catalyst and water injected into the micro channel of the reformer to fill the micro channel with the catalyst by gravity.

3. The method according to claim 1, wherein the step of filling the catalyst in the micro channel without forming any voids in the micro channel comprises:

injecting the mixture of the catalyst and water into the micro channel of the reforming apparatus; and tilting the reforming apparatus with the mixture of the catalysts and water injected into the micro channel thereof to fill the micro channel with the catalysts by gravity, wherein the procedures of injecting and tilting are repeated until the micro channel is completely filled with the catalyst.

4. The method according to claim 1, further comprising sealing a catalyst inlet with the same material as a substrate or a cover after drying the catalyst in the micro channel.

* * * * *